United States Patent [19] [11] 4,162,240
Hino et al. [45] Jul. 24, 1979

[54] PROCESS FOR PRODUCTION OF NOVEL POLYMER EMULSION

[75] Inventors: Minoru Hino, Takatsuki; Seimei Yasui, Takarazuka; Akira Shintani, Toyonaka, all of Japan

[73] Assignee: Sumitomo Chemical Company, Limited, Osaka, Japan

[21] Appl. No.: 815,263

[22] Filed: Jul. 13, 1977

[30] Foreign Application Priority Data

Jul. 22, 1976 [JP] Japan .................................. 51-87806
Sep. 22, 1976 [JP] Japan ................................ 51-114280
Mar. 25, 1977 [JP] Japan .................................. 52-33471
Apr. 19, 1977 [JP] Japan .................................. 52-45268

[51] Int. Cl.$^2$ .............................................. C08L 2/22
[52] U.S. Cl. ........................... 260/29.7 B; 260/23.7 B; 260/29.7 R; 260/29.7 AT; 260/29.7 DP; 260/29.7 H; 260/29.6 XA
[58] Field of Search ...................... 260/29.7 B, 29.7 R, 260/29.7 AT, 29.6 XA, 29.7 DP, 29.7 H; 204/181 R

[56] References Cited

U.S. PATENT DOCUMENTS 3,983,062 9/1976 Baldwin et al. ............. 260/29.7 EM
4,075,135 2/1978 Jozwiak et al. .............. 260/29.7 AT

FOREIGN PATENT DOCUMENTS 48-73488 10/1973 Japan .
49-43381 10/1974 Japan .
50-66591 6/1975 Japan .

Primary Examiner—V. P. Hoke
Attorney, Agent, or Firm—Birch, Stewart, Kolasch & Birch

[57] ABSTRACT

A process for production of a polymer emulsion comprising polymerizing at least one partially esterified, imidated or amidated product of an adduct with a compound having a polymerizable unsaturated group and a hydroxy group, epoxy group or amino group, in an aqueous system in the presence or absence of a vinyl monomer, said adduct being produced by adding an $\alpha,\beta$-unsaturated dicarboxylic acid or anhydride thereof to at least one compound selected from the group consisting of a synthetic unsaturated polymer having a number average molecular weight of 150 to 30,000 and an iodine value of 50 to 500, a natural drying oil, a natural semidrying oil and an unsaturated fatty acid which composes the natural drying or semidrying oils. The polymer emulsion shows excellent coating film properties when used for paints.

8 Claims, No Drawings

PROCESS FOR PRODUCTION OF NOVEL POLYMER EMULSION

BACKGROUND AND SUMMARY OF THE INVENTION

The present invention relates to a process for the production of a vinyl graft polymer emulsion and a high molecular weight polymer emulsion having excellent coating film properties.

Synthetic resin emulsions have been widely used for paints, adhesives, fibers, papers or the like.

The paints produced from an aqueous emulsion of a synthetic resin are more advantageous than solvent type paints, because they do not have such defects as being susceptible to fire, poisoning, and air pollution which have occasionally occurred when using the solvent type paints. Besides, the paints produced from high molecular weight polymers have a lower viscosity than the solvent type paints, and hence, can be used in a high concentration, whereby they have an excellent workability for painting and easy management after painting. However, the paints have some defects, such as a lower water resistance due to the use of an emulsifier or a protective colloid, inferior glossiness of the coating film, and inferior air-tightness of the coating film. From these standpoints, there have been conducted various studies on curable or uncurable high molecular weight emulsifiers which can be used instead of water-soluble or hydrophilic, low molecular weight emulsifiers which cause the undesirable lowering of the performances of the paints, such as lowering of water resistance.

It is described in Japanese Patent Publication No. 43381/1974 and Japanese Patent Laid Open Publication (without examination) No. 73488/1973 that an emulsion is produced by polymerizing a vinyl monomer in the presence of maleinated polybutadiene or maleinated butadiene copolymer as an emulsifier. As a result of re-examination of this process, the present inventors have found that the emulsion produced by the process described in Japanese Patent Publication No. 43381/1974 has an inferior stability and further inferior properties of the resulting coating film such as inferior water resistance and corrosion resistance, because the maleinated product of polybutadiene having many 1,4-bonds in the molecule has the double bonds within the inner part thereof and hence the graft polymerization with the vinyl monomer hardly proceeds. For eliminating the defects of this process, the present inventors have tried to enhance the graft polymerization activity of the maleinated product of polybutadiene. As a result, it has been found that the object can be accomplished by adding a compound having a vinyl-polymerizable double bond to the maleinated product of a polydiolefin having many 1,4-bonds or a copolymer thereof.

The vinyl graft polymer emulsion of the present invention has various advantages. For instance, when it is compared with so-called non-graft emulsion which is produced by emulsion-polymerizing a vinyl monomer in the presence of a neutralized product of the liquid polybutadienemaleinated product having many 1,4-bonds as the emulsifier, the emulsion of the present invention has more fine particle size of emulsion and further an improved freeze stability, miscibility of pigment and mechanical stability, as shown in examples and reference examples hereinafter.

The superiorities of the present emulsion are further realized when the emulsion is formed into a dry coating film. That is, the drying of the coating film made from the present emulsion is far faster than that made from the non-graft emulsion. In the non-graft emulsion, a metallic drier should be added. If the metallic drier is not added, extended periods of time are required for the coating film to dry as tested by finger touch, and when the coating film is very thick, it is impossible to cure completely. In the graft emulsion of the present invention, the coating film can be cured within a short time at room temperature without adding the metallic drier. The cured coating film has excellent chemical resistance, water resistance and also excellent glossiness. When a metallic drier is added to the graft emulsion of the present invention wherein the base polymer still has a few unsaturated groups, there can also be obtained a coating film having a higher degree of hardness.

Thus, the coating film made from the graft emulsion of the present invention shows far greater drying characteristics and also far greater water resistance and chemical resistance in comparison with the coating film made from the non-graft emulsion.

These superior properties of the coating film of the present invention may be as a result of the improved homogeneity of the resin system wherein the base polymer is grafted, while the homogeneity in the non-graft system is substantially inferior.

The present inventors have found that the desired emulsion, which can give a coating film having excellent water resistance and glossiness, can be produced by emulsion-polymerizing a vinyl monomer using as the emulsifier a partially esterified, imidated or amidated product of an adduct of a diene polymer (e.g. polybutadiene, polyisoprene, or copolymer of butadiene or isoprene with another monomer), a natural drying oil or a natural semidrying oil with an $\alpha,\beta$-unsaturated dicarboxylic acid or anhydride thereof, said parital esterification, imidation or amidation being carried out by adding to the adduct a compound having a polymerizable unsaturated group with the vinyl group.

As the result of further extensive studies of the present inventors, it has been found that the desired graft polymer emulsion having excellent properties can also be produced by using a wide range of oligomers having an unsaturated group other than the polybutadiene etc., having 1,4-bonds as the base polymer.

For instance, when a 1,2-bond polybutadiene having a pendant vinyl group, which is graft polymerizable, is partially esterified by introducing 2-hydroxyethyl methacrylate and then is graft-polymerized, an emulsion having excellent performance, such as excellent coating film properties and stability, can be produced. It is assumed from this fact that the graft polymerizability owing to the methacryl or acryl group introduced by the present invention contributes far more to the improvement of the performances of emulsion than does the graft polymerizability owing to the pendant vinyl group of the liquid 1,2-vinyl polybutadiene.

Moreover, it has been found that the desired graft polymer emulsion having excellent performance properties can also be produced from unsaturated polymers such as petroleum resins, natural drying or semidrying oils or unsaturated fatty acids which compose the natural drying or semidrying oils of the present invention.

Another embodiment of the present invention provides a process for emulsion-polymerizing oligomers, which are produced by introducing a polymerizable unsaturated group (e.g. acryl or methacryl group) into the above unsaturated polymers, in an aqueous medium.

It is well known that the drying characteristics and coating film properties of paints can effectively be improved by enlarging the molecular weight of the vehicle resin. However, this produces various defects, such as too high viscosity, or difficult handling during the preparation thereof and the painting. These defects, particularly the high viscosity, can be eliminated by the emulsion polymerization of the present invention.

The polymer emulsion can be formed by the crosslinking polymerization of synthetic oligomers or natural drying or semidrying oils, which have unsaturated groups having a high oxidative polymerizability in the main chain, in fine emulsion particles.

The polymer emulsion of the present invention consists of fine particles and a low viscosity while the polymer per se has a high molecular weight and is occasionally crosslinkaged, and the polymer emulsion can give a coating film having excellent gloss and toughness.

An object of the present invention is to provide a novel polymer emulsion having excellent performance properties, particularly excellent coating film properties.

Another object of the present invention is to provide a vinyl graft polymer emulsion or high molecular weight polymer emulsion useful for paints, adhesives, fibers, papers, or the like.

These and other objects and advantages of the present invention will be apparent from the following detailed description given hereinafter; it should be understood, however, that the detailed description and accompanying specific examples, while indicating preferred embodiments of the invention, are given by way of illustration only, since various changes and modifications within the spirit and scope of the invention will become apparent to those skilled in the art from this detailed description. These changes and modifications are intended to be ecompassed within the scope of this invention.

SUMMARY OF THE INVENTION

According to the present invention, the desired vinyl graft polymer emulsion and high molecular weight polymer emulsion can be produced by polymerizing at least one partially esterified, imidated or amidated product of an adduct with a compound having a polymerizable unsaturated group and a hydroxy, epoxy or amino group in the molecule in an aqueous medium in the presence or absence of a vinyl monomer, said adduct being produced by adding an $\alpha,\beta$-unsaturated dicarboxylic acid or anhydride thereof to at least one compound selected from the group consisting of a synthetic unsaturated polymer having a number average molecular weight of 150 to 30,000 and an iodine value of 50 to 500, a natural drying oil, a natural semidrying oil and an unsaturated fatty acid which composes the natural drying or semidrying oils (hereinafter, referred to as "A compound").

The emulsion of the present invention can give a coating film having excellent water resistance and gloss, when it is coated onto a base material.

The A compounds used in the present invention include synthetic unsaturated polymers having a number average molecular weight of 150 to 30,000. When the number average molecular weight is lower than 150, the polymer does not show the characteristics of the graft polymer, and hence, it can not give the desired coating film having excellent solvent resistance and strength. On the other hand, when it is over 30,000, the polymer has too high a viscosity, and hence, it is hardly maleinated or esterified. Suitable examples of the synthetic unsaturated polymers are diene polymers (e.g. polybutadiene, polyisoprene, poly-1,3-pentadiene, a butadiene-styrene copolymer, an isoprene-styrene copolymer, a butadiene-ethylene copolymer, a butadiene-propylene copolymer, a butadiene-butene-1 copolymer, an isoprene-ethylene copolymer, an isoprene-propylene copolymer, an isoprene-isobutylene copolymer, an isoprene-butadiene copolymer, a butadiene-1,3-pentadiene copolymer, an isoprene-1,3-pentadiene copolymer, a butadiene-acetylene copolymer, an isoprene-acetylene copolymer, a butadiene-acrylonitrile copolymer, an isoprene-acrylonitrile copolymer), $C_5$ petroleum resins, $C_9$ petroleum resins, high $\alpha$-olefins, or the like. The micro structure of the diene polymers is not limited to the specific one. The A compounds include also natural drying or semidrying oils, such as tung oil, perilla oil, castor oil, dehydrated castor oil, linseed oil, soybean oil, cottonseed oil, sesame oil, rapeseed oil, cuttlefish oil, or fish oil; and unsaturated fatty acids which compose these natural drying or semidrying oils. Preferred A compounds are diene polymers such as a homopolymer or copolymer of butadiene or isoprene.

The adduct of the A compound with the $\alpha,\beta$-unsaturated dicarboxylic acid or anhydride thereof can easily be produced by reacting with agitation the A compound with an $\alpha,\beta$-unsaturated dicarboxylic acid or anhydride thereof under an inert gas at 150° to 230° C. for 3 to 10 hours, whereby the $\alpha,\beta$-unsaturated dicarboxylic acid or anhydride thereof is substantially quantitatively added. This addition reaction may optionally be carried out in the presence of an appropriate solvent or an appropriate agent for inhibiting the undesirable increase of viscosity, such as an antioxidant, a peroxide decomposer or an anti-gelling agent.

The $\alpha,\beta$-unsaturated dicarboxylic acid or anhydride thereof includes maleic anhydride, maleic acid, fumaric acid, itaconic acid, citraconic acid, or the like.

The addition ratio of the $\alpha,\beta$-unsaturated dicarboxylic acid or anhydride thereof to the A compound (i.e. the content (% by weight) of the $\alpha,\beta$-unsaturated dicarboxylic acid or anhydride thereof in the adduct) is in the range of 3 to 60% by weight. When the addition ratio is less than 3% by weight, the stability of the vinyl graft polymer emulsion or high molecular weight polymer emulsion derived from the adduct is inferior. On the other hand, when the addition ratio is over 60% by weight, it has too high a viscosity and hence the reaction for the production of the emulsion hardly proceeds and further, the water resistance of the emulsion tends to unfavorably decrease.

The adduct of the A compound with the $\alpha,\beta$-unsaturated dicarboxylic acid or anhydride thereof is then partially esterified, imidated or amidated with a compound having a polymerizable unsaturated group and a hydroxy, epoxy or amino group (hereinafter, referred to as "B compound").

This partial esterification, imidation or amidation may be carried out by the conventional methods as used in the partial esterification, imidation or amidation of a carboxylic acid or anhydride thereof with an amine, alcohol, or the like. For instance, both the adduct and B compound are reacted in an appropriate solvent or without solvent at 30° to 150° C. in the presence of a polymerization inhibitor and optionally a catalyst such as a mineral acid, an organic acid or an amine. Alternatively, when the B compound is a compound having a polymerizable unsaturated group and a hydroxy or epoxy group, the adduct of the A compound with the $\alpha,\beta$-unsaturated dicarboxylic acid or anhydride thereof is neutralized with a basic compound of an equivalent amount to half acid value of the adduct in the coexistence of the B compound in an appropriate solvent or without solvent, whereby the desired partially esterified product can easily be produced.

The partial esterification, imidation or amidation means that the adduct is esterified, imidated or amidated in the range of 10 to 90% of the total acid value of the adduct with the B compound. When the adduct is esterified, imidated or amidated in the ratio of less than 10%, the esterified, imidated or amidated product has a small polymerizability, and hence, there will not be produced the desired polymer emulsion having sufficiently excellent performance properties. On the other hand, when the ratio of the esterification, imidation or amidation is over 90%, the self-emulsifiability of the product is decreased owing to the decrease of the free carboxyl group, and hence the polymer emulsion obtained therefrom is unfavorably inferior in stability.

The B compounds used in the present invention include diallylamine, aminoethyl methacrylate, t-butylaminoethyl methacrylate, 2-hydroxyethyl methacrylate, 2-hydroxyethyl acrylate, 2-hydroxypropyl methacrylate, glycidyl methacrylate, glycidyl acrylate, N-methylol-methacrylamide, allyl alcohol, or the like.

When the esterified, imidated or amidated product has free carboxyl groups or carboxylic anhydride groups, the free carboxyl groups or carboxylic anhydride groups, preferably 20 to 100% thereof, are neutralized with a basic compound, and the neutralized product is used in the subsequent emulsion polymerization step.

The basic compounds used for the neutralization include ammonia, amines, or hydroxide, oxide, carbonate or dicarbonate of alkali metals (e.g. lithium, sodium, potassium). The amines include all compounds which are usually used for the neutralization of a free carboxyl group or carboxylic anhydride group, for instance, monovalent amines, such as monoethylamine, diethylamine, triethylamine, monopropylamine, dipropylamine, monobutylamine, monoethanolamine, diethanolamine, triethanolamine, dimethylaminoethanol, diethylaminoethanol, monoisopropanolamine, morpholine; polyvalent amines, such as ethylenediamine, diethylenetriamine, triethylenetetramine, or the like.

The emulsion polymerization of a polymerizable vinyl monomer in the present invention may be carried out in the same manner as in the conventional emulsion polymerization of a polymerizable vinyl monomer, that is, by reacting the neutralized product of the partially esterified, imidated or amidated product as mentioned above, a polymerizable vinyl monomer and a radical polymerization initiator in water at 0° to 100° C., optionally in the presence of a water-soluble or hydrophilic organic solvent. The high molecular weight polymer emulsion may be produced in the same manner as described above except that the polymerizable vinyl monomer is omitted.

The radical polymerization initiators used herein include all conventional water-soluble or oil-soluble polymerization initiators, for instance, inorganic polymerization initiators (e.g. ammonium persulfate, potassium persulfate, or hydrogen peroxide), and organic polymerization initiators (e.g. benzoyl peroxide, azobisisobutyronitrile, or cumene hydroperoxide). Besides, ultraviolet radiation, ultraviolet radiation and sensitizer, electron radiation, ultrasonic wave, sulfide compounds, sulfonic compounds, or redox polymerization initiator may also be used.

The water-soluble or hydrophilic organic solvents include alcoholic solvents (e.g. methanol, ethanol, propanol, etc.), ether solvents (ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, dioxane, etc.), ester solvents (e.g. ethyl acetate, etc.), amide solvents (e.g. acetamide, propionamide, etc.), and ketone solvents (e.g. acetone, methyl ethyl ketone, etc.).

Vinyl monomers used in the present invention include acrylic or methacrylic esters of the formula:

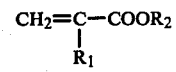

wherein $R_1$ is hydrogen or methyl, $R_2$ is an alkyl having 1 to 18 carbon atoms; styrene; $\alpha$-methylstyrene; p-chlorostyrene; vinyl-toluene; methoxybutyl acrylate; methoxybutyl methacrylate; methoxyethyl acrylate, methoxyethyl methacrylate, ethoxybutyl acrylate, ethoxybutyl methacrylate, allyl acrylate, allyl methacrylate, glycidyl methacrylate, glycidyl acrylate, hydroxypropyl methacrylate, diethylaminoethyl methacrylate, allyloxyethyl acrylate allyloxyethyl methacrylate, vinylpyridiene, butadiene, isoprene, chloroprene, acrylonitrile, methacrylonitrile, vinyl acetate, vinyl chloride, acrylic acid, methacrylic acid, itaconic acid, acrylamide, methacrylamide, N-methylacrylamide, N-methylolacrylamide, N-methylolmethacrylamide, 2-hydroxyethyl methacrylate, acrolein, or the like. These vinyl monomers may be used alone or in a combination of two or more. The amount of the vinyl monomers depends on the kind of monomer and utility of the product, but is preferably about 0.01 to about 100 fold (by weight) of the amount of the partially esterified, imidated or amidated product.

The aqueous emulsion produced by the present invention is useful as a paint vehicle, and is admixed with the conventional ingredients for paints, such as driers (e.g. cobalt naphthenate, manganese naphthenate), pigments (e.g. titanium white, calcium carbonate, colorless silicic acid), wetting agents, plasticizers, thickening agents, water, or the like to give an emulsion paint having excellent drying characteristics and water resistance.

Besides, owing to the excellent toughness and adhesion thereof, the aqueous emulsion of the present invention can be also be used for adhesives or other utilities.

PREFERRED EMBODIMENTS

The present invention is illustrated by the following Examples and Reference Examples, but is not limited thereto.

REFERENCE EXAMPLE 1

A 500 ml four-necked flask equipped with a stirrer, a thermometer, a condenser and a tube for blowing nitrogen gas is charged with a liquid polybutadiene having a number average molecular weight: 1680, a viscosity:

650 cps at 20° C., an iodine value (Wijs method): 445, cis-1,4 structure: 76%, trans-1,4 structure: 23% and 1,2-vinyl structure: 1% (255 g) and maleic anhydride (45 g). After purging the flask with nitrogen gas, the mixture is reacted at 190° C. for 4 hours under nitrogen gas to give maleinated polybutadiene (total acid value: 160, half acid value: 79).

The maleinated polybutadiene thus obtained (60 g) is taken in the 500 ml beaker and is neutralized with aqueous potassium hydroxide (KOH: 0.8 g/ml, 12.0 ml) and thereto is added demineralized water (180 g) to give a KOH-neutralized aqueous solution of maleinated polybutadiene in the emulsion state (pH: 8.4).

The KOH-neutralized aqueous solution of maleinated polybutadiene thus obtained (80 g), demineralized water (10 g), styrene (10 g) and ammonium persulfate (10 mg) are charged into a 200 ml four-necked flask. After sufficiently purging the flask with nitrogen gas, the mixture is polymerized with stirring at 50° to 80° C. for about 3 hours to give a polymer emulsion having homogeneous appearance. The polymer emulsion has a pH value: 8.5, solid components in dry state: 29.3% by weight, and viscosity: 10.2 cps at 25° C. (with Brookfield viscometer).

REFERENCE EXAMPLE 2

A 300 ml flask equipped with a stirrer, a thermometer, a condenser and a tube for blowing nitrogen gas is charged with the KOH-neutralized aqueous solution of maleinated polybutadiene as obtained in Reference Example 1 (80 g), demineralized water (80 g), butyl methacrylate (40 g) and ammonium persulfate (20 mg). After purging the flask with nitrogen gas, the mixture is polymerized with stirring at 50° to 80° C. for about 3 hours to give a polymer emulsion having a homogeneous appearance. The polymer emulsion has a pH value: 8.2, solid components in dry state: 28.8% by weight and viscosity: 17.9 cps at 25° C.

REFERENCE EXAMPLE 3

A 200 ml flask equipped with a stirrer, a thermometer, a condenser and a tube for blowing nitrogen gas is charged with the maleinated polybutadiene as prepared in Reference Example 1 (100 g) and amyl alcohol (13.5 g). After purging the flask with nitrogen gas, the mixture is reacted with stirring at 130° C. for 2 hours and further 150° C. for 30 minutes to give a half-esterified product, which has total acid value: 74 and ester value: 70, from which it is confirmed that the product is half esterified.

The half-esterified product (60 g) is taken into a 500 ml beaker and is diluted with butyl cellosolve (15 g) and then is neutralized with a 28% aqueous ammonia (4.8 g). The neutralized product is dissolved in demineralized water (120 g) to give an ammonia-neutralized aqueous solution of maleinated polybutadiene half-esterified with amyl alcohol in the emulsion paste state (pH: 8.3).

The ammonia-neutralized aqueous solution of the half-ester (65.6 g), deaerated demineralized water (74.4 g), styrene (10 g) and ammonium persulfate (10 mg) are charged into a 200 ml four-necked flask. After purging the flask with nitrogen gas, the mixture is polymerized with stirring at 50° to 80° C. for about 3 hours to give a homogeneous polymer emulsion. The polymer emulsion has a pH value: 8.1, solid components in dry state: 20.0% by weight, and viscosity: 220 cps at 25° C.

REFERENCE EXAMPLE 4

A 500 ml four-necked flask with a stirrer, a thermometer, a condenser and a tube for blowing nitrogen gas is charged with linseed oil (255 g) and maleic anhydride (45 g). The mixture is reacted at 190° C. for 6 hours under nitrogen gas pressure to give maleinated oil (total acid value: 157, half acid value: 75).

A 300 ml four-necked flask equipped with a stirrer, a thermometer, a condenser and a tube for blowing a nitrogen gas is charged with the meleinated polybutadiene as prepared in Reference Example 1 (23 g) and the above maleinated linseed oil (23 g). The mixture is neutralized with a 28% aqueous ammonia (7.89 g) and thereto are added demineralized water (128 g), ammonium persulfate (20 mg) and styrene (23 g). The mixture is polymerized with stirring at 50° to 80° C. for 4 hours under nitrogen gas to give a homogeneous polymer emulsion having a pH value: 7.9, solid components in dry state: 35.0% by weight, and viscosity: 12.0 cps at 25° C.

REFERENCE EXAMPLE 5

By using the same flask (500 ml, four-necked) as used in Reference Example 1, linseed oil (270 g) and maleic anhydride (30 g) are reacted at 190° C. for 6 hours under nitrogen gas to give maleinated linseed oil (total acid value: 108, half acid value: 53.5).

The maleinated linseed oil (10 g) and the maleinated polybutadiene as prepared in Reference Example 1 (10 g) are charged into a 300 ml four-necked flask equipped with the same devices. The mixture is neutralized with a 28% aqueous ammonia (2.90 g), and thereto are added deaerated demineralized water (120 g), ammonium persulfate (60 mg), ethyl acrylate (42 g) and methyl methacrylate (18 g). The mixture is stirred at 50° to 80° C. for 5 hours under nitrogen gas to give a homogeneous emulsion having a pH value: 8.0, solid components at dry state: 39.8% by weight and viscosity: 21 cps at 25° C.

REFERENCE EXAMPLE 6

A 500 ml four-necked flask equipped with a stirrer, a thermometer, a condenser and a tube for blowing nitrogen gas is charged with a liquid polybutadiene having a number average molecular weight: 1,000, viscosity: 1,000 cps at 45° C., and 1,2-vinyl structure: 85% (a tradename: NISS-PB,B-1000, made by Nippon Soda, 255 g), maleic anhydride (45 g) and 1,4-dihydroxynaphthalene (200 mg). After purging the flask with nitrogen gas, the mixture is reacted at 190° C. for 8 hours under nitrogen gas to give maleinated polybutadiene (total acid value: 163, half acid value: 83.8).

The maleinated polybutadiene (30 g) is taken into a 300 ml four-necked flask and is neutralized with a 28% aqueous ammonia (5.88 ml) and thereto is added demineralized water (105 g) to give an ammonia-neutralized aqueous solution of maleinated polybutadiene in the emulsion state (pH: 8.4).

To the solution are added n-butyl methacrylate (60 g) and ammonium persulfate (10 mg). After purging the flask with nitrogen gas, the mixture is polymerized at 50° to 80° C. for about 3 hours to give a polymer emulsion having a homogeneous appearance, which has a pH value: 8.0 and solid components in dry state: 45.0% by weight.

REFERENCE EXAMPLE 7

A 300 ml flask equipped with a stirrer, a thermometer, a condenser and a tube for blowing nitrogen gas is charged with the maleinated polybutadiene as prepared in Reference Example 6 (100 g) and n-amyl alcohol (13.5 g). The mixture is reacted at 130° C. for 3 hours under nitrogen gas to give a half-esterified product (total acid value: 73, saponification value: 144).

The half-esterified product (30 g) is charged into a 300 ml flask and is neutralized with a 28% aqueous ammonia (2.63 ml) and thereto is added demineralized water (108 g) to give a dispersion in the emulsion state. To the dispersion are added n-butyl methacrylate (60 g) and ammonium persulfate (10 mg). After purging the flask with nitrogen gas, the mixture is polymerized with stirring at 50° to 80° C. for about 3 hours to give a polymer emulsion having a homogeneous appearance, which has a pH value: 8.2 and solid components in dry state: 44.9% by weight.

REFERENCE EXAMPLE 8

A 300 ml four-necked flask equipped with a stirrer, a thermometer, a condenser and a tube for blowing nitrogen gas is charged with the ammonia-neutralized solution of maleinated polybutadiene half-esterified with amyl alcohol as prepared in Reference Example 3 (33 g), deaearated demineralized water (47 g), ammonium persulfate (10 mg) and n-butyl methacrylate (20 g). After purging the flask with nitrogen gas, the mixture is polymerized with stirring at 50° to 80° C. for about 3 hours to give a polymer emulsion having a homogeneous appearance, which has a pH value: 8.0, solid components in dry state: 29.0% by weight and viscosity: 105 cps at 25° C.

REFERENCE EXAMPLE 9

In the same manner as described in Reference Example 1, the same liquid polybutadiene as used in Reference Example 1 (277.5 g) and maleic anhydride (22.5 g) are reacted to give a maleinated polybutadiene (total acid value: 82, half acid value: 42).

The maleinated polybutadiene (60 g) is taken into a 500 ml beaker and is diluted with butyl cellosolve (15 g) and then is neutralized with a 28% aqueous ammonia (5.3 g) and thereto is added demineralized water (124.7 g) to give an emulsion paste product (pH: 8.1).

The ammonia-neutralized aqueous solution of maleinated polybutadiene thus produced (50 g), deaerated demineralized water (40 g), ammonium persulfate (10 mg) and styrene (10 g) are charged into a 200 ml four-necked flask. The mixture is polymerized in the same manner as described in Reference Example 1 to give a homogeneous polymer emulsion having a pH value: 7.9, solid components in dry state: 24.9% by weight and viscosity: 87 cps at 25° C.

REFERENCE EXAMPLE 10

A 500 ml four-necked flask is charged with 1,3-pentadiene polymer having a number average molecular weight: 1,000 and iodine value: 370 (a tradename: QUINTOL B-1000, made by Nippon Zeon Co., 255 g), maleic anhydride (45 g) and N-phenyl-α-naphthylamine as a gelation inhibitor (50 mg). The mixture is reacted at 190° C. for 7 hours under nitrogen gas to give a maleinated product (total acid value: 168, half acid value: 80).

The maleinated product (30 g) is charged into a 300 ml four-necked flask and is neutralized with a 28% aqueous ammonia (6.0 ml) and thereto is added demineralized water (149 g). To the mixture are added styrene (15 g), n-butyl acrylate (35 g) and ammonium persulfate (10 mg) and the mixture is emulsion-polymerized at 50° to 80° C. for 5 hours under nitrogen to give a homogeneous emulsion having a pH value: 8.2 and solid components in dry state: 34.0% by weight.

EXAMPLE 1

A 500 ml four-necked flask equipped with a stirrer, a thermometer, a condenser and a tube for blowing nitrogen gas is charged with a liquid polybutadiene having a number average molecular weight: 1680, viscosity: 650 cps at 20° C., iodine value (Wijs method): 445, cis-1,4 structure: 76% trans-1,4 structure: 23% and 1,2-vinyl structure: 1% (340 g) and maleic anhydride (60 g). The mixture is reacted at 190° C. for 4 hours under nitrogen gas to give a maleinated polybutadiene (total acid value: 162, half acid value: 80).

The maleinated polybutadiene (200 g), toluene (100 g), 2-hydroxyethyl methacrylate (40 g) and hydroquinone (70 mg) are charged into another 500 ml, four-necked flask. The mixture is reacted with stirring at 90° C. for 16 hours under nitrogen gas, and the solvent and volatile components are removed at a temperature as low as possible and under reduced pressure to give a yellowish brown, viscous, partially esterified product (238 g). The product has total acid value: 78 and saponification value: 215, from which it is confirmed that the product is sufficiently partially esterified.

The partially esterified product (20 g) and demineralized water (48 g) are charged into a 200 ml four-necked flask and thereto is added dropwise with stirring an aqueous potassium hydroxide solution (KOH: 0.8 g/ml, 1.95 ml) to give a homogeneous solution. To the solution are added ammonium persulfate (10 mg) and purified styrene (10 g). The mixture is stirred at 50° to 80° C. for 4 hours under nitrogen gas to give a clear polymer emulsion having a pH value: 7.8, solid components in dry state (105° C.×3 hours): 39.5% by weight and viscosity: 35 cps at 25° C.

When the emulsion thus obtained was coated onto an iron plate, the coating film was dried within about 20 minutes according to a touch test with a finger.

A dispersion (10 parts by weight) prepared by adding titanium white (5 parts by weight) to a 50% aqueous solution of acryl resin (4 parts by weight) and water (1 part by weight) was mixed with the above emulsion (20 parts by weight) and cobalt naphthenate (metal component: 6% by weight, 0.67 part by weight) to give a white paint. The paint was coated with a bar coater onto a soft steel panel to give a coating film, on which various properties were tested.

For comparison purposes, by using the emulsions as prepared in Reference Examples 1 and 3, paints were prepared in the same manner as described above, and the paints were coated onto a soft steel panel likewise to give a coating film, on which various properties were also tested.

The results are shown in the following Table 1.

Table 1

|  | Example 1 | Reference Example 1 | Reference Example 3 |
|---|---|---|---|
| Stability of emulsion | Excellent | Bad | Excellent |

Table 1-continued

|  | | Example 1 | Reference Example 1 | Reference Example 3 |
|---|---|---|---|---|
| State of dispersion of pigment | | Excellent | Inferior | Inferior |
| Tack (100° C. × 20 minutes) | | No tack | Sticky | Sticky |
| Gloss | Room temp. × 24 hours | 92 | 29 | 69 |
| | 100° C. × 20 minutes | 91 | 35 | 75 |
| | 160° C. × 20 minutes | 90 | 25 | 45 |
| Pencil hardness | Room temp. × 24 hours | HB | 3B | 3B |
| | 100° C. × 20 minutes | H | HB | HB |
| | 160° C. × 20 minutes | 2H | HB | HB |
| Water resistance (dipping at room temperature for 7 days) | Room temp. × 24 hours | Normal | Blistering immediately after dipping | Blistering immediately after dipping |
| | 100° C. × 20 minutes | Normal | Blistering | Blistering |
| | 160° C. × 20 minutes | Normal | Blistering | Blistering |

[Note]:
(1) The thickness of the coating film was 30-32 μ.
(2) The stability of emulsion and the state of dispersion of pigments were evaluated by naked eyes when the paint was coated.
(3) The tack was evaluated by touching with a finger.
(4) Gloss was measured at 60° C.

As is clear from the above Table 1, the emulsion of Example 1 shows excellent stability and particularly excellent drying characteristics. Besides, the coating film produced from the emulsion has an excellent gloss and also excellent water resistance.

EXAMPLE 2

A 300 ml four-necked flask equipped with a stirrer, a thermometer, a condenser and a tube for blowing nitrogen gas is charged with the maleinated polybutadiene partially esterified with 2-hydroxyethyl methacrylate as prepared in Example 1 (20 g) and demineralized water (93 g). To the mixture is added dropwise with stirring an aqueous solution of potassium hydroxide (0.8 g/ml, 1.85 ml) to give a homogeneous solution. To the solution are added ammonium persulfate (10 mg) and purified n-butyl methacrylate (40 g), and the mixture is stirred at 50° to 80° C. for 4 hours under nitrogen gas to give a homogeneous polymer emulsion having a pH value: 7.7, solid components in dry state: 40.0% by weight and viscosity: 51 cps at 25° C.

When the drying characteristics of the emulsion were tested by touching with a finger in the same manner as in Example 1, it has dried within about 30 minutes. Besides, the emulsion of this example and the emulsion in Reference Example 2 were each coated onto an iron plate and then baked at 120° C. for 20 minutes. As a result, the coating film of the present invention had excellent gloss and toughness and there was observed no change even when it was dipped in water for 7 days. To the contrary, when the coating film obtained from the emulsion of Reference Example 2 was dipped in water, the coating film was blushed and partially peeled off.

EXAMPLE 3

The maleinated linseed oil as prepared in Reference Example 4 (100 g), toluene (50 g), 2-hydroxyethyl methacrylate (23.9 g), triethylamine (0.8 g) and hydroquinone monomethyl ether (20 mg) are reacted with stirring at 80° C. for 3 hours and the volatile components are removed under reduced pressure to give a yellowish red, viscous, partially esterified product. The partially esterified product has total acid value: 62 and saponification value: 196, from which it is confirmed that the product is sufficiently partially esterified.

The above partially esterified product of linseed oil (10 g) and the partially esterified product of polybutadiene as prepared in Example 1 (10 g) are charged into a 200 ml four-necked flask, and the mixture is neutralized with a 28% aqueous ammonia (1.52 g) and thereto is added demineralized water (48 g). To the resulting solution are added ammonium persulfate (10 mg) and styrene (10 g), and the mixture is stirred at 50° to 80° C. for 4 hours to give a clean polymer emulsion having a pH value: 7.5, solid components in dry state (105° C.×3 hours): 40.0% by weight and viscosity: 26 cps at 25° C.

When the emulsion was coated onto an iron plate, the coating film was dried within about 25 minutes, as tested by touching with a finger.

Besides, in the same manner as described in Example 1, a white paint was prepared by using the above emulsion. The paint was coated with a bar coater onto a soft steel panel to give a coating film on which various properties were tested.

For comparison purposes, a paint was prepared by using the emulsion as prepared in Reference Example 4, likewise, and the paint was coated onto a soft steel panel to give a coating film, on which various properties were also tested.

The results are shown in the following Table 2.

Table 2

|  | | Example 3 | Reference Example 4 |
|---|---|---|---|
| Stability of emulsion | | Excellent | Inferior |
| State of dispersion pigment | | Excellent | Bad |
| Tack (100° C. × 20 minutes) | | No tack | Sticky |
| Gloss | Room temp. × 24 hours | 91 | 60 |
| | 100° C. × 20 minutes | 90 | 58 |
| | 160° C. × 20 minutes | 90 | 45 |
| Pencil hardness | Room temp. × 24 hours | HB | 3B |
| | 100° C. × 20 minutes | H | HB |
| | 160° C. × 20 minutes | 2H | HB |
| Water | Room temp. × 24 hours | Normal | Blistering immediately |

Table 2-continued

|  |  | Example 3 | Reference Example 4 |
|---|---|---|---|
| resistance | | | after dipping |
| (dipping at | 100° C. × 20 minutes | Normal | Blistering |
| room temperature | 160° C. × 20 minutes | Normal | Blistering |
| for 7 days) | | | |

[Note]:
(1)The thickness of the coating film was 30–32 μ.
(2)The stability of emulsion and the state of dispersion of pigments were evaluated by naked eyes when the paint was coated.
(3)The tack was evaluated by touching with a finger.
(4)Gloss was measured at 60° C.

As is clear from Table 2, the emulsion of Example 3 shows excellent stability and is particularly excellent in drying characteristics. The coating film prepared therefrom has excellent gloss and water resistance.

EXAMPLE 4

A 200 ml four-necked flask equipped with a stirrer, a thermometer, a condenser and a tube for blowing nitrogen gas is charged with the partially esterified product of maleinated polybutadiene with 2-hydroxyethyl methacrylate (hereinafter, referred to as "HEMA") as prepared in Example 1 (10 g) and the partially esterified product of maleinated linseed oil with HEMA as prepared in Example 3 (10 g). The mixture is neutralized with a 28% aqueous ammonia (1.52 g) and thereto is added deaerated demineralized water (87 g). To the resulting solution are added butyl cellosolve (3.0 g), ammonium persulfate (40 mg), ethyl acrylate (28 g) and methyl methacrylate (12 g), and the mixture is stirred at 50° to 80° C. for 5 hours under nitrogen gas to give a homogeneous polymer emulsion having a pH value: 7.5, solid components in dry state: 39.2% by weight and viscosity: 15 cps at 25° C.

When the drying characteristics of this emulsion were tested in the same manner as in Example 1, the coating film prepared therefrom dried within about 25 minutes.

The emulsion of this example and the emulsion in Reference Example 5 were each coated onto an iron plate and then baked at 120° C. for 20 minutes. The coating film of the present invention had excellent gloss and toughness, and when it was dipped in water for 7 days, no change was observed. To the contrary, the coating film prepared from the emulsion of Reference Example 5 was blushed and partially peeled off after dipping for 30 minutes.

EXAMPLE 5

A 300 ml four-necked flask equipped with the same devices as that in Example 4 is charged with the partially esterified product of maleinated linseed oil with HEMA as prepared in Example 3 (30 g), which is neutralized with triethylamine (3.35 g) and thereto is added deaerated demineralized water (117 g). To the resulting solution are added ammonium persulfate (45 mg), ethyl acrylate (25 g) and methyl methacrylate (15 g) and the mixture is stirred at 50° to 80° C. for 6 hours under nitrogen gas to give a homogeneous polymer emulsion having a pH value: 7.3, solid components in dry state: 39.5% by weight and viscosity: 25 cps at 25° C.

In the same manner as described in Example 3, a paint was prepared by using this emulsion, and the properties thereof were tested. The results are shown in the following Table 3.

EXAMPLE 6

A 200 ml four-necked flask is charged with the maleinated polybutadiene as prepared in Example 1 (30 g), toluene (30 g) and HEMA (6.0 g) and thereto is added dropwise with stirring a 28% aqueous ammonia (2.63 g) at room temperature. After stirring for about one hour, toluene and other volatile components are removed under reduced pressure to give a partially esterified product. This product has an ester value of 130, and when the ester value owing to HEMA is deducted from the value, the ester value is 58, which is owing to the esterification of maleic anhydride group with HEMA, from which it is confirmed that the desired partial esterification proceeds.

The partially esterified product (20 g), demineralized water (70 g), ammonium persulfate (20 mg) and purified vinyltoluene (10 g) are charged into a 200 ml four-necked flask, and the mixture is polymerized with stirring at 50° to 80° C. for 5 hours under nitrogen gas to give a clean polymer emulsion.

In the same manner as described in Example 3, a paint was prepared by using the emulsion, and the properties thereof were tested. The results are shown in Table 3.

EXAMPLE 7

In the same manner as described in Example 6, to a mixture of the maleinated polybutadiene as prepared in Example 1 (30 g), toluene (30 g) and allyl alcohol (2.7 g) is added dropwise with stirring triethylamine (4.32 g) at room temperature, and the mixture is treated likewise to give a partially esterified product having an ester value: 72. According to infrared spectrum, the product loses the absorption of 1780–1860 cm$^{-1}$ owing to the stretching vibration coupling of two C=O groups in the acid anhydride and shows a strong absorption of 1730–1740 cm$^{-1}$ owing to the ester group, by which it is confirmed that the desired partial esterification proceeds.

A mixture of the partially esterified product (10 g), n-butyl acrylate (25 g), methyl methacrylate (15 g), demineralized water (75 g) and potassium persulfate (30 mg) is polymerized with stirring at 30° to 80° C. for 7 hours under nitrogen gas to give a polymer emulsion having a good dispersibility, which has a pH value: 8.0, solid components in dry state: 39.2% by weight and viscosity: 71 cps at 25° C.

In the same manner as described in Example 3, a paint was prepared by using this emulsion, and the properties thereof tested. For comparison purposes, the paints as prepared from emulsions in Reference Example 8 and 9 were also tested. The results are shown in Table 3.

Table 3

|  | Example 6 | Example 7 | Reference Example 8 | Reference Example 9 |
|---|---|---|---|---|
| Stability of emulsion | Excellent | Excellent | Excellent | Good |
| State of dispersion of pigment | Excellent | Excellent | Excellent | Bad |
| Tack (100° C. × 20 minutes) | No tack | No tack | Sticky | Sticky |
| Gloss 100° C. × 20 minutes | 89 | 90 | 68 | 32 |
| Gloss 160° C. × 20 minutes | 89 | 89 | 60 | 29 |
| Pencil hardness 100° C. × 20 minutes | H | HB | 2B | 3B |
| Pencil hardness 160° C. × 20 minutes | 2H | H | HB | 2B |
| Water resistance (dipping at room temperature for 7 days) 100° C. × 20 minutes | Normal | Normal | Blistering | Blushing, peeling off |
| Water resistance (dipping at room temperature for 7 days) 160° C. × 20 minutes | Normal | Normal | Blistering | Blistering |

[Note]:
The thickness of the coating film was 29–31 μ.

EXAMPLE 8

A 500 ml four-necked flask equipped with a stirrer, a thermometer, a condenser and a tube for blowing nitrogen gas is charged with the maleinated product of 1,2-vinyl type liquid polybutadiene as prepared in Reference Example 6 (50 g) and toluene (50 g) and thereto are added HEMA (10 g) containing hydroquinone monomethyl ether (50 mg) and triethylamine (1.0 ml), and the mixture is reacted at 80° C. for 3 hours. Toluene and other volatile components are removed under reduced pressure to give a viscous half-esterified product. This product has total acid value: 73 and saponification value: 200, from which it is confirmed that the desired half-esterification proceeds.

The half-esterified product (20 g) and demineralized water (90 g) are charged into a 200 ml four-necked flask, and thereto is added dropwise with stirring a 28% aqueous ammonia (1.75 ml) to give a homogeneous solution. To the solution are added ammonium persulfate (10 mg) and n-butyl acrylate (40 g), and the mixture is stirred at 50° to 80° C. for 4 hours under nitrogen gas to give a fine, homogeneous polymer emulsion having a pH value: 7.6 and solid components in dry state (105° C.×3 hours): 39.0% by weight.

When the emulsion was coated into an iron plate, the coating film was dried within about 20 minutes as tested by touching with a finger.

In the same manner as described in Example 1, a white paint was prepared by using the emulsion, and the paint was coated onto a soft steel panel, and various properties of the coating film were tested. For comparison purposes, paints were prepared by using the emulsions in Reference Example 6 and 7 and were each coated on a soft steel panel, likewise, and the properties of the coating film were also tested. The results are shown in the following Table 4.

Table 4

|  |  | Example 8 | Reference Example 6 | Reference Example 7 |
|---|---|---|---|---|
| Stability of emulsion |  | Excellent | Bad | Excellent |
| State of dispersion of pigment |  | Excellent | Inferior | Inferior |
| Tack (Room temp. × 30 minutes) |  | No tack | Sticky | Sticky |
| Gloss | Room temp. × 24 hours | 94 | 60 | 79 |
| Gloss | 100° C. × 20 minutes | 92 | 73 | 76 |
| Gloss | 160° C. × 20 minutes | 91 | 58 | 67 |
| Pencil hardness | Room temp. × 24 hours | HB | 3B | 3B |
| Pencil hardness | 100° C. × 20 minutes | H | F | F |
| Pencil hardness | 160° C. × 20 minutes | 2H | HB | HB |
| Water resistance (dipping at room temperature for 7 days) | Room temp. × 24 hours | Normal | Blistering immediately after dipping | Blistering immediately after dipping |
| Water resistance (dipping at room temperature for 7 days) | 100° C. × 20 minutes | Normal | Blistering | Blistering |
| Water resistance (dipping at room temperature for 7 days) | 160° C. × 20 minutes | Normal | Blistering | Blistering |

[Note]:
(1)The thickness of the coating film was 30–32 μ.
(2)The stability of emulsion and the state of dispersion of pigments were evaluated by naked eyes when the paint was coated.
(3)The tack was evaluated by touching with a finger.
(4)Gloss was measured at 60° C.

As is clear from Table 4, the emulsion of Example 8 shows excellent stability and is particularly excellent in drying characteristics. Besides, the coating film has excellent gloss and water resistance.

EXAMPLE 9

A 300 ml four-necked flask equipped with a stirrer, a thermometer, a condenser and a tube for blowing nitrogen gas is charged with the partially esterified product of maleinated polybutadiene with HEMA as prepared in Example 8 (20 g) and demineralized water (89 g) and thereto is added dropwise with stirring a 28% aqueous ammonia (1.75 ml) to give a homogeneous solution. To the solution are added ammonium persulfate (10 mg), purified styrene (20 g) and n-butyl acrylate (20 g) and the mixture is stirred at 50° to 80° C. for 5 hours under nitrogen gas to give a homogeneous polymer emulsion having a pH value: 7.8 and solid components in dry state: 40.0% by weight.

When the drying characteristics of the emulsion was tested by touching with a finger in the same manner as described in Example 1, the coating film had dried within about 25 minutes.

The emulsion was coated onto an iron plate and baked at 100° C. for 20 minutes to give a coating film having a thickness: 30μ, pencil hardness: HB and having an excellent gloss and toughness. When the coated product was dipped in boiling water for 2 hours, there was observed no change in the coating film.

EXAMPLE 10

In the same manner as described in Example 1, 1,3-pentadiene polymer having a number average molecular weight: 1000 and iodine value: 370 (a tradename: QUINTOL B-1000, made by Nippon Zeon Co., 170 g), maleic anhydride (30 g) and N-phenyl-α-naphthylamine (40 mg) are reacted at 190° C. for 6 hours under nitrogen gas to give a maleinated product (total acid value: 167, half acid value: 80).

The maleinated product (50 g), toluene (50 g), HEMA (10 g), hydroquinone monomethyl ether (100 mg) and triethylamine (1.0 ml) are reacted with stirring at 80° C. for 3 hours, and toluene and other volatile components are removed under reduced pressure to give a partially esterified product (total acid value: 70).

The partially esterified product (20 g), butyl cellosolve (5 g), demineralized water (93 g) and a 28% aqueous ammonia (1.7 ml) are mixed with stirring in a 300 ml four-necked flask to give a neutralized solution. To the solution are added styrene (10 g), n-butyl acrylate (24 g) and ammonium persulfate (10 mg), and the mixture is polymerized with stirring at 50° to 80° C. for 8 hours under nitrogen gas to give a finely dispersed polymer emulsion having a pH value: 7.9 and solid components in dry state: 35.0% by weight.

When the emulsion was coated onto an iron plate, the coating film dried within about 15 minutes as tested by touching with a finger.

In the same manner as described in Example 1, a white paint was prepared by using the emulsion, and the white paint was coated with a bar coater onto a soft steel panel and then baked at 100° C. for 20 minutes to give a coating film having a thickness: 30μ, gloss: 92 and pencil hardness: H. When the coated product was dipped in boiling water for 2 hours, there was observed no change of the coating film.

For comparison purpose, a white paint was prepared by using the emulsion in Reference Example 10 likewise, and the paint was coated onto a soft steel panel and baked at 100° C. for 20 minutes to give a coating film having a thickness: 28μ, gloss: 70, pencil hardness: F-HB. When the coated product was dipped in boiling water, there was observed the occurrence of blistering within about 10 minutes and further partial peeling off of the coating film 30 minutes later. From these results, it will be clear that the graft polymer emulsion of the present invention has a far superior performances in comparison with the emulsion of the Reference Example 10.

EXAMPLE 11

In the same manner as described in Example 1, the maleinated product of 1,2-vinyl type liquid polybutadiene as prepared in Reference Example 6 (70 g), toluene (70 g), allyl alcohol (7.0 g) and triethylamine (1.5 ml) are reacted at 80° C. for 3 hours, and the volatile components are removed under reduced pressure to give a partially esterified product (total acid value: 75, saponification value: 74).

The partially esterified product (20 g) is neutralized with a 28% aqueous ammonia (1.8 ml) and thereto is added demineralized water (110 g). To the resulting solution are added n-butyl methacrylate (40 g) and ammonium persulfate (10 mg), and the mixture is reacted at 50° to 80° C. for 5 hours under nitrogen gas to give a fine emulsion having a pH value: 7.9 and solid components in dry state: 34.7% by weight.

When the drying characteristics of the emulsion was tested by touching with a finger in the same manner as in Example 1, the coating film had dried within about 20 minutes.

A paint prepared from the emulsion was coated onto a soft steel panel and baked at 100° C. for 20 minutes to give a coating film having a thickness: 30μ and an excellent gloss. When the coated product was dipped in water for 20 days, there was observed no change of the coating film.

EXAMPLE 12

A 500 ml four-necked flask is charged with the maleinated polybutadiene as prepared in Example 1 (200 g), toluene (100 g), HEMA (40 g), hydroquinone monomethyl ether (30 mg) and triethylamine (1.6 g). The mixture is reacted with stirring at 75° to 80° C. for 3 hours, and the volatile components are removed under reduced pressure to give a yellowish brown, viscous, partially esterified product (239 g). This product has total acid value of 73, from which it is confirmed that the desired partial esterification sufficiently proceeds.

The partially esterified product (35 g) and demineralized water (63 g) are charged into a 200 ml four-necked flask, and thereto is added dropwise with stirring a 28% aqueous ammonia (1.9 g) under nitrogen gas to give a homogeneous aqueous dispersion. To the dispersion is added a solution of ammonium persulfate (100 mg) in demineralized water (2 g), and the mixture is stirred at 50° to 80° C. for 5 hours to give a homogeneous polymer emulsion having a pH value: 7.4 and solid components in dry state: 34.9% by weight.

When the polymer emulsion was coated onto an iron plate, the coating film had dried within about 17 minutes as tested by touching with a finger, from which it was confirmed that the drying characteristics of the emulsion had significantly improved.

In the same manner as described in Example 1, a white paint was prepared by using the emulsion, and the paint was coated with a bar coater onto a soft steel panel to give a coating film, the various properties of which were tested.

For comparison purposes, paints were prepared by using a homogeneous aqueous dispersion prepared from the above partially esterified product (35 g), demineralized water (63 g) and a 28% aqueous ammonia (1.9 g) and also a homogeneous solution prepared from the above maleinated liquid polybutadiene (50 g), demineralized water (100 g), butyl cellosolve (50 g) and a 28% aqueous ammonia (9.3 g). Further, the paints were each coated onto a soft steel panel to give a coating film, the properties of which were also tested.

The results are shown in the following Table 5.

Table 5

| | Example 12 | Comparison Partially esterified product of maleinated liquid polybutadiene with HEMA | Maleinated liquid polybutadiene with HEMA |
| --- | --- | --- | --- |
| Stability of emulsion | Excellent | Inferior | Excellent |
| State of dispersion of pigment | Excellent | Inferior | Inferior |
| Tack  Room temp. × 24 hours | No tack | Sticky | Sticky |
| 120° C. × 20 minutes | No tack | Sticky | Sticky |
| Gloss  Room temp. × 24 hours | 93 | 47 | 74 |
| 120° C. × 20 minutes | 91 | 35 | 55 |
| Pencil  Room temp. × 24 hours | HB | Higher than 3B | Higher than 3B |
| hardness  120° C. × 20 minutes | 2H | HB | HB |
| Water  Room temp. × 24 hours | Normal | Blistering immediately after dipping | Blistering immediately after dipping |
| resistance (dipping at room temperature for 7 days)  120° C. × 20 minutes | Normal | Blistering | Blistering |

[Note]:
(1) The thickness of the coating film was 30–32 μ.
(2) The stability of emulsion and the state of dispersion of pigments were evaluated by naked eyes when the paint was coated.
(3) The tack was evaluated by touching with a finger.
(4) Gloss was measured at 60° C.

As is clear from Table 5, the emulsion of the present invention has excellent drying characteristics, and has excellent film coating properties even though the compound has a high molecular weight (particularly, it can give a coating film having an excellent surface gloss). The emulsion of the present invention has superior water resistance when compared to the conventional emulsions.

EXAMPLE 13

A 500 ml four-necked flask is charged with the 1,2-vinyl type maleinated polybutadiene as prepared in Reference Example 6 (100 g), toluene (100 g), hydroquinone monomethyl ether (30 mg), HEMA (20 g) and triethylamine (0.8 g). The mixture is reacted with stirring at 80° C. for 3 hours, and the volatile components are removed under reduced pressure to give a yellowish brown, viscous, partially esterified product. The product has a total acid value: 71, from which it is confirmed that the partially esterified product is produced.

The partially esterified product (30 g) and demineralized water (66 g) are charged into a 200 ml four-necked flask, and thereto is added a 28% aqueous ammonia (1.4 g) to give a homogeneous aqueous dispersion. To the dispersion is added a solution of ammonium persulfate (100 mg) in demineralized water (2 ml), and the mixture is stirred at 50° to 80° C. for 5 hours to give a homogeneous polymer emulsion having a pH value: 7.3 and solid components in dry state: 29.9% by weight.

When the emulsion was coated onto an iron plate, the coating film dried within 27 minutes as tested by touching with a finger. For comparison purposes, an aqueous dispersion prepared by neutralizing the partially esterified product with ammonia without adding ammonium persulfate was coated onto an iron plate likewise, but the coating film thus obtained did not dry even after one day.

In the same manner as described in Example 1, a white paint was prepared by using the emulsion of Example 13, and was coated onto a soft steel panel to give a coating film, various properties of which were tested. The results are shown in the following Table 6.

EXAMPLE 14

Linseed oil (sold by Nakai Chemical Co., 85 g), maleic anhydride (15 g) and N-phenyl-α-naphthylamine (17 mg) are reacted at 190° C. for 5 hours to give a maleinated product (total acid value: 158).

The maleinated product of linseed oil (75 g), HEMA (15 g), hydroquinone monomethyl ether (15 mg) and triethylamine (0.6 g) are reacted in the same manner as described in Example 1 to give a partially esterified product (total acid value: 72.0).

The partially esterified product (40 g), demineralized water (60 g) and a 28% aqueous ammonia (1.25 g) are mixed to give a homogeneous aqueous dispersion. To the dispersion is added ammonium persulfate (100 mg) under nitrogen gas and the mixture is stirred at 80° C. for 5 hours to give a homogeneous polymer emulsion having a pH value: 7.6 and solid components: 40% by weight.

When the emulsion was coated onto an iron plate, the coating film dried within 25 minutes as tested by touching with a finger.

In the same manner as described in Example 1, a white paint was prepared by using this emulsion, the various properties of which were tested likewise. The results are shown in Table 6.

EXAMPLE 15

QUINTOL B-1000 (made by Nippon Zeon Co., 170 g), maleic anhydride (30 g) and N-phenyl-α-naphthylamine (35 mg) are reacted at 190° C. for 8 hours to give a maleinated product (total acid value: 159, half acid value: 80).

The maleinated product (50 g), HEMA (10 g), hydroquinone monomethyl ether (50 mg) and triethylamine (0.76 g) are reacted in toluene at 80° C. for 3.5 hours, and the solvent is removed under reduced pressure to give a viscous, partially esterified product (total acid value: 69.7).

The partially esterified product (30 g), demineralized water (68 g) and a 28% aqueous ammonia (1.12 g) are reacted to give a homogeneous dispersion and thereto is added ammonium persulfate (100 mg) under nitrogen gas, and the mixture is reacted at 80° C. for 5 hours to give a homogeneous polymer emulsion having a pH value: 6.3 and solid components: 30% by weight.

When the emulsion was coated onto an iron plate, the coating film dried within 27 minutes as tested by touching with a finger.

In the same manner as described in Example 1, a white paint was prepared by using the emulsion, the various properties of which were tested likewise. The results are shown in Table 6.

For comparison purposes, a white paint was prepared by using a commercially available styrene-acrylic resin emulsion for paint, the properties of which were also tested. The results are also shown in Table 6.

Table 6

|  |  | Example 13 | Example 14 | Example 15 | Commercially available emulsion paint*[1] |
|---|---|---|---|---|---|
| Stability of emulsion | | Excellent | Excellent | Excellent | Excellent |
| State of dispersion of pigment | | Excellent | Excellent | Excellent | Inferior |
| Tack | Room temp. × 2 hours | No tack | No tack | No tack | Sticky |
| | 120° C. × 20 minutes | No tack | No tack | No tack | No tack |
| Gloss | Room temp. × 24 hours | 95 | 83 | 50 | 75 |
| | 120° C. × 20 minutes | 94 | 80 | 90 | 73 |
| Pencil hardness | Room temp. × 24 hours | HB | B | F | 2B |
| | 120° C. × 20 minutes | 2H–3H | F | 3H | HB |
| Water resistance (dipping at room temperature for 7 days) | Room temp. × 24 hours | Normal | Normal | Normal | Blistering immediately after dipping |
| | 120° C. × 20 minutes | Normal | Normal | Normal | Blistering |

[Note]:
*[1] Styrene-acrylic copolymer emulsion

EXAMPLE 16

A liquid polybutadiene having a number average molecular weight: 600, viscosity: 65 cps at 20° C., iodine value: 440, cis-1,4 structure: 60%, trans-1,4 structure: 32% and 1,2-vinyl structure: 8% (255 g), iron naphthenate (0.36 g) and maleic anhydride (45 g) are reacted at 190° C. for 4 hours under nitrogen gas to give a maleinated product (total acid value: 164, half acid value: 83).

The maleinated product (200 g), HEMA (40 g), hydroquinone monomethyl ether (20 mg) and triethylamine (0.8 g) are stirred at 80° C. for 3 hours to give a partially esterified product (total acid value: 72, saponification value: 208).

The partially esterified product (40 g), demineralized water (59 g) and a 28% aqueous ammonia (1.3 g) are mixed to give a homogeneous aqueous dispersion. To the dispersion is added ammonium persulfate (100 mg) under nitrogen gas, and the mixture is stirred at 80° C. for 5 hours to give a homogeneous polymer emulsion having a pH value: 7.4 and solid components: 40% by weight.

When the emulsion was coated onto an iron plate, the coating film dried within 22 minutes as tested by touching with a finger. The coating film had a gloss.

The emulsion was coated onto a paper to give a coating film having excellent gloss, transparency and flexibility.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A process for production of a polymer emulsion comprising emulsion polymerizing in an aqueous system at least one adduct which has been at least partially esterified, imidated, or amidated by reacting said adduct with a compound selected from at least one member of the group consisting of aminoethyl methacrylate, t-butylaminoethyl methacrylate, 2-hydroxyethyl methacrylate, 2-hydroxyethyl acrylate, 2-hydroxypropyl methacrylate, glycidyl methacrylate, glycidyl acrylate and N-methylol-methacrylamide in an aqueous system in the presence or absence of a vinyl monomer, said adduct being produced by adding an α,β-unsaturated dicarboxylic acid or anhydride thereof to a synthetic unsaturated polymer, having a number average molecular weight of 150 to 30,000 and an iodine value of 50 to 500, selected from at least one member of the group consisting of a diene polymer, $C_5$ petroleum resin and $C_9$ petroleum resin, wherein the addition ratio of the α,β-unsaturated dicarboxylic acid or anhydride thereof to the synthetic unsaturated resin is in the range of 3 to 60% by weight and wherein the partial esterification, imidation and amidation is carried out in the range of 10 to 90% of the total acid value of the adduct.

2. The process according to claim 1, wherein said synthetic unsaturated polymer is a diene polymer selected from at least one member of the group consisting of polybutadiene, polyisoprene, poly-1,3-pentadiene, a butadiene-styrene copolymer, an isoprene-styrene copolymer, a butadiene-ethylene copolymer, a butadiene-propylene copolymer, a butadiene-butene-1 copolymer, an isoprene-ethylene copolymer, an isoprene-propylene copolymer, an isoprene-isobutylene copolymer, an isoprene-butadiene copolymer, a butadiene-1,3-pentadiene copolymer, an isoprene-1,3-pentadiene copolymer, an isoprene-acrylonitrole copolymer, a butadiene-acrylonitrile copolymer, a butadiene-acetylene copolymer, and an isoprene-acetylene copolymer.

3. The process according to claim 1, wherein the α,β-unsaturated dicarboxylic acid or anhydride thereof is a member selected from at least one member of the group consisting of maleic anhydride, maleic acid, fumaric acid, itaconic acid and citraconic acid.

4. The process according to claim 1, wherein the partially esterified, imidated or amidated product is neutralized with a basic compound before the polymerization thereof.

5. The process according to claim 4, wherein the basic compound is selected from at least one member of the group consisting of ammonia, an alkali metal hydroxide, oxide, carbonate or bicarbonate, a monovalent amine and a polyvalent amine.

6. The process according to claim 5, wherein the basic compound is a monovalent or polyvalent amine selected from at least one member of the group consisting of monoethylamine, diethylamine, triethylamine, monopropylamine, dipropylamine, monobutylamine, monoethanolamine, diethanolamine, triethanolamine, dimethylaminoethanol, diethylaminoethanol, monoisopropanolamine, morpholine, ethylenediamine, diethylenetriamine and triethylenetetramine.

7. The process according to claim 1, wherein the vinyl monomer is selected from at least one member of the group consisting of an acrylic or methacrylic ester of the formula:

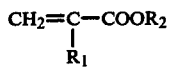

wherein $R_1$ is hydrogen or methyl, $R_2$ is an alkyl having 1 to 18 carbon atoms, styrene, α-methylstyrene, p-chlorostyrene, vinyltoluene, methoxybutyl acrylate, methoxybutyl methacrylate, methoxyethyl acrylate, methoxyethyl methacrylate, ethoxybutyl acrylate, ethoxybutyl methacrylate, allyl acrylate, allyl methacrylate, glycidyl methacrylate, glycidyl acrylate, hydroxypropyl methacrylate, diethylaminoethyl methacrylate, allyloxyethyl acrylate, allyloxyethyl methacrylate, vinylpyridine, butadiene, isoprene, chloroprene, acrylonitrile, methacrylonitrile, vinyl acetate, vinyl chloride, acrylic acid, methacrylic acid, itaconic acid, acrylamide, methacrylamide, N-methylacrylamide, N-methylolacrylamide, N-methylolmethacrylamide, 2-hydroxyethyl methacrylate and acrolein.

8. A polymer emulsion produced according to the process of claim 1.

* * * * *